Dec. 26, 1967   P. J. KLEMMER   3,359,938
HEAD GLUER
Filed Aug. 16, 1965

Inventor
Paul J. Klemmer
By Dressler, Goldsmith, Clement, Gordon & Ladd
Attorneys

3,359,938
HEAD GLUER
Paul J. Klemmer, Appleton, Wis., assignor to Appleton Machine Company, a corporation of Wisconsin
Filed Aug. 16, 1965, Ser. No. 479,900
1 Claim. (Cl. 118—6)

ABSTRACT OF THE DISCLOSURE

An adhesive applicator for applying adhesive onto the peripheral surface of a circular header. The applicator includes a rotatable turntable driven by a suitable motor. An adhesive extruder is pivotally and adjustably mounted above said turntable to allow for positioning of the extruder adjacent the periphery of a circular header to which adhesive to be applied in which position it is capable of being maintained in floating equilibrium. Switch means associated with said adhesive extruder initiates, when activated, a supply of adhesive through the extruder under pressure and simultaneously causes the motor to be energized to initiate rotation of the turntable. After one revolution of the turntable, another switch effects stoppage of the adhesive supply and the turntable. In this way, a controlled amount of adhesive is applied to the turntable within precisely defined radial limits on the circular headers.

---

Figure 1:
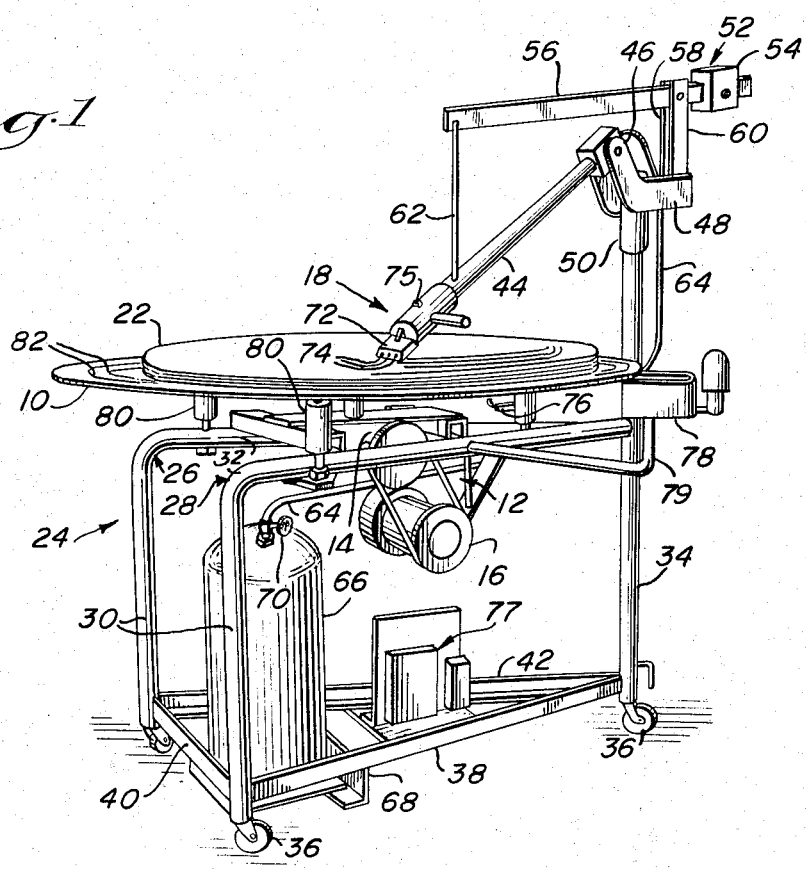

This invention relates to adhesive applicators, especially of the type used in the application of adhesive in a circular path to the surface of a disc-like member, commonly termed a header, used to cover or cap the end of a roll.

The ends of a roll of sheet material are subject to damage from shipping and handling. To prevent this, circular caps or headers are commonly secured to the ends of the roll to protect them from physical damage. These headers are generally attached by adhesive, e.g., adhesive is sprayed onto the surface of the header which is to contact the end of the roll. Unfortunately, the adhesive cannot in this way be applied with sufficient accuracy to (1) location, (2) quantity, or (3) uniformity, so that such header-protected rolls are not entirely satisfactory. Thus, the headers are sometimes too easily dislodged due to insufficient adhesive, or, in order to insure adhesion, excess adhesive is applied. This often means that the end of the roll must be completely covered with an inner end piece before applying the header to prevent excess glue or adhesive from contacting the edges of the roll and causing the individual layers to stick together.

Accordingly, the invention is directed to adhesive applicators which enable accurate and uniform application of a viscous adhesive in a circular path so that, by such control of the adhesive application, the above mentioned inadequacies can be overcome.

In accordance with the invention, the application of adhesive onto a header is accurately controlled by extruding a viscous liquid adhesive in the form of a bead onto the header in a circular path, relying upon the constant pressure of extrusion from a glue extruder, and the constant rotational speed of a turntable carrying the header to provide the precise control of adhesive quantity, uniformity and placement in a single revolution of the turntable. The glue extruder is equipped with a start mechanism which synchronously controls the extrusion of adhesive and the rotation of the turntable so that, in one complete revolution, the desired amount of adhesive is uniformly applied to the header in a circular path, providing the positive and accurate control needed to avoid the difficulties previously encountered.

Another aspect of the invention is its ability to accommodate headers of the same diameter, stacked one atop the other, on the turntable to increase operator efficiency by cutting down the number of manipulations required between application of adhesive to successive headers.

A further aspect of the invention is its ability to accommodate headers of various diameters, e.g., ranging from 9 inches to 60 inches, by merely positioning the applicator arm.

Additionally, the invention serves to minimize waste due to overspray, glue fog, dripping, and cleanup of the mess usually associated with spray application is avoided. Also, the structure of the invention requires little maintenance and is ready to go after extended periods of shutdown without significant preparation.

Figure 2:
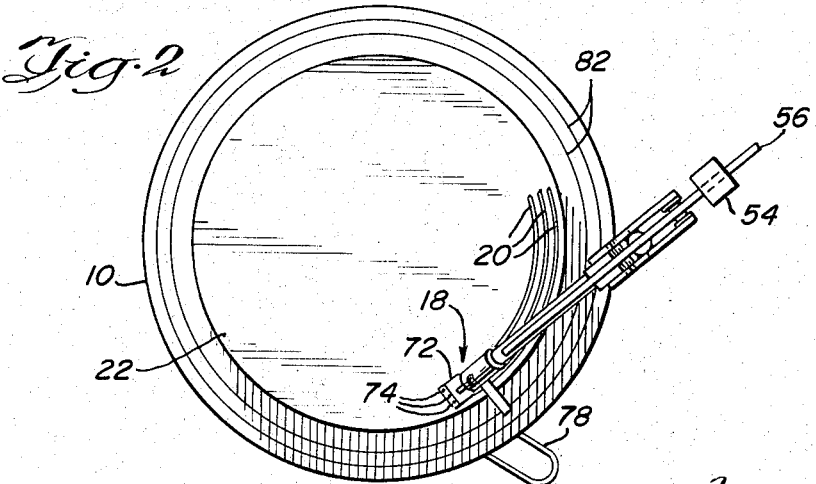

The invention will be more fully understood in the description which follows, taken in conjunction with the accompanying drawings, in which:

FIGURE 1 is a perspective view of a preferred head gluing device as it would appear in operation; and FIGURE 2 is a plan view of the device showing the application of adhesive in a circular path.

Referring to FIGURE 1, a turntable 10 is rotatably mounted on a drive assembly 12, including a gear reduction unit 14 and a motor 16. The turntable 10 is geared to revolve at a constant rotational speed, synchronized with the extrusion of adhesive from an adhesive extruder 18, to provide a precise bead of adhesive 20 onto a header 22 in a single revolution.

The turntable 10 and drive assembly 12 are mounted on a triangular shaped tubular frame 24 having leg elements 26 and 28 each formed to include a vertical portion 30 and a horizontal portion 32 secured to an upright frame element 34, as shown. The lower ends of the frame elements 26, 28 are equipped with roller wheels 36 to provide means of manipulating the device. Three braces, 38, 40, 42 are secured to the frame elements 26, 28, 34, respectively, immediately above the roller wheels 36, serving to tie the frame elements together and strengthen the structure, while also providing means for securing other equipment, as will be discussed hereinafter.

An applicator arm 44 is pivotally mounted between the upward sloped open end 46 of a U-shaped clamp 48 for movement in a vertical plane. The clamp 48 is secured about a cap 50 rotatably fitted atop the frame element 34. The pivotal securement of the applicator arm 44 and the rotatable securement of the clamp 48 enables the arm 44 to move in both a vertical and horizontal direction. The free end of the applicator arm is fitted with the glue extruder 18, which floats above the surface of the header 22 while adhesive is extruded downwardly therefrom in precisely regulated beads 20. The glue extruder 18 may be held in equilibrium by a balance mechanism 52. The balance mechanism 52 includes a weight 54 slidingly mounted on a balance arm 56 one end of which is pivotally secured between extension rods 58, 60 to the closed end of the U-shaped clamp 48. The opposite end of the balance arm 56 is connected to the applicator arm 44 by a link 62. The balance of the glue extruder 18 and applicator arm 44 is regulated by the appropriate positioning of the weight 54 along the balance arm 56.

Adhesive is supplied under pressure to the glue extruder 18 through supply line 64, which runs through the applicator arm 44 from an adhesive storage tank 66. The storage tank 66 is carried by a suitable supporting platform 68 spanning the triangular frame formed by the braces 38, 40, 42. The adhesive supply is regulated by a pressure gauge 70 mounted on the storage tank 66. The glue extruder includes a body portion 72 through which a number of orifices 74 extend, providing passages for the flow of adhesive from the supply line 64. The supply line 64 will be understood to be flexible enough to follow the movement of the applicator arm 44.

The glue extruder 18 may be equipped with a motor and pressure switch 75, which when depresed opens a valve in the adhesive supply line which allows adhesive to extrude onto the header, and simultaneously completes an electric circuit actuating the electric motor 16 which starts the turntable 10 rotating. The rotational distance traveled by the turntable 10 is controlled by a limit switch 76, so that when the limit switch 76 detects the completion of a single revolution of the turntable 10, it de-energizes control circuitry 77 to disengage the pressure switch 75 which shuts off the motor 16, stopping the turntable and simultaneously stopping the flow of adhesive. This coordinated action provides a precise circular bead of adhesive to be applied to a header in a single complete revolution.

After the completion of an application of adhesive, or while storing the device, the applicator arm 44 may be positioned so that the glue extruder 18 rests in a mount 78 when it is not in use. The mount 78 carries a moist sponge or the like (not shown) to prevent adhesive from clogging within the glue extruder body 72 and orifices 74, and is positioned and secured in the path of horizontal arc of the applicator arm 44 by a rod member 79.

Stabilizing rollers 80 are fixedly secured to the horizontal portions 32 of the frame elements 26, 28 to provide support for the turntable 10 and to insure that the turntable remains relatively horizontal at all times.

The operation of the device is quite simple, the operator selects an appropriate header, ranging in diameter from 9 inches to 60 inches, and places it on the turntable 10, centering it by means of the concentric circular centering grooves or marks 82 which are conveniently spaced at two inch intervals. After the header is centered on the turntable 10, (the turntable is capable of carrying a stack of superposed headers) the operator positions the applicator arm 44 so that the glue extruder 18 is above the header in the desired position and the balance mechanism 52 is adjusted to provide the desired equilibrium of the applicator arm 44. At this time, the pressure gauge 70 is set at an appropriate pressure, so that the adhesive will extrude through the adhesive supply line 64 at the desired rate when the pressure switch 75 is depressed.

The turntable 10 will then go through and complete a single revolution as described hereinbefore, applying a uniform circular bead of adhesive 20 onto the header 22. At the end of the single revolution, the pressure switch 75 is deactivated, the turntable 10 stops and the adhesive supply is simultaneously discontinued.

It will be readily observed from the foregoing detailed description of the invention and in the illustrated embodiment thereof that numerous variations and modifications may be effected without departing from the true spirit and scope of the novel concepts and principles of this invention.

What is claimed is:

An adhesive applicator for applying a controlled amount of adhesive onto the peripheral surface of a circular header comprising in combination a turntable, a motor for rotating said turntable, an adhesive extruder, means pivotally supporting said adhesive extruder above said turntable for universal adjustment to position said extruder adjacent the periphery of a header disposed on the turntable, balancing means associated with said pivotable support means for maintaining said adhesive extruder in floating equilibrium in said position, means coupled to said adhesive extruder for supplying adhesive thereto under pressure, first switch means for energizing said adhesive supply means to extrude adhesive through said extruder onto the peripheral surface of said header within selected radial limits and for simultaneously energizing said motor to rotate said turntable during adhesive extrusion, and second switch means responsive to a single revolution of said turntable for opening said first switch means to discontinue the adhesive supply and de-energize said motor, whereby a controlled amount of adhesive is applied to the periphery of said header.

References Cited

UNITED STATES PATENTS 2,419,951   5/1947   Kastel.
2,608,177   8/1952   Powers _____ 118—320
2,770,211   11/1956  Gustafson.

DANIEL BLUM, *Primary Examiner.*